(12) United States Patent  
Dickson et al.

(10) Patent No.: US 9,340,301 B2  
(45) Date of Patent: May 17, 2016

(54) LINE CAPTURE DEVICES FOR UNMANNED AIRCRAFT, AND ASSOCIATED SYSTEMS AND METHODS

(71) Applicant: Insitu, Inc., Bingen, WA (US)

(72) Inventors: Matthew Robert Dickson, Hood River, OR (US); Craig Aram Thomasian, The Dalles, OR (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 14/569,443

(22) Filed: Dec. 12, 2014

(65) Prior Publication Data

US 2015/0307209 A1    Oct. 29, 2015

Related U.S. Application Data

(60) Division of application No. 13/483,330, which is a continuation of application No. PCT/US2011/053534, filed on Sep. 27, 2011, now Pat. No. 8,944,373.

(60) Provisional application No. 61/386,956, filed on Sep. 27, 2010.

(51) Int. Cl.
  *B64F 1/02* (2006.01)
  *B64F 1/04* (2006.01)
  *B64C 39/02* (2006.01)

(52) U.S. Cl.
  CPC .............. *B64F 1/04* (2013.01); *B64C 39/024* (2013.01); *B64C 2201/182* (2013.01)

(58) Field of Classification Search
  USPC ................................ 244/110 C, 110 F, 110 G
  See application file for complete search history.

(56) References Cited

U.S. PATENT DOCUMENTS 965,881 A    8/1910   Draper
968,339 A    8/1910   Geraldson
(Continued)

FOREIGN PATENT DOCUMENTS

CN    1032645    5/1989
DE    4301671    7/1993
(Continued)

OTHER PUBLICATIONS

International Search Report and Written Opinion for International Patent Application No. PCT/US2011/053534, Applicant: Insitu, Inc., mailed Feb. 6, 2012, 10 pages.
(Continued)

*Primary Examiner* — Brian M O'Hara
*Assistant Examiner* — Keith L Dixon
(74) *Attorney, Agent, or Firm* — Perkins Coie LLP

(57) ABSTRACT

Line capture devices for unmanned aircraft, and associated systems and methods are disclosed. A system in accordance with a particular embodiment includes a line capture device body having a line slot with an open end and a closed end. A retainer is positioned proximate to the line slot and has a rotor with a plurality of rotor arms positioned to extend at least partially across the line slot as the rotor rotates relative to the body. A joint rotatably couples the rotor to the body, and a ratchet device is operably coupled to the rotor to allow the rotor to rotate in a first direction and at least restrict the rotor arm from rotating in a second direction opposite the first. In other embodiments, the retainer can include other arrangements, for example, one or more wire-shaped elements.

19 Claims, 8 Drawing Sheets

(56) References Cited

U.S. PATENT DOCUMENTS

| | | | |
|---|---|---|---|
| 975,953 A | 11/1910 | Hourwich | |
| 1,144,505 A | 6/1915 | Steffan | |
| 1,164,967 A | 12/1915 | Thorp | |
| 1,317,631 A | 9/1919 | Kinser | |
| 1,383,595 A | 7/1921 | Black | |
| 1,384,036 A | 7/1921 | Anderson | |
| 1,428,163 A | 9/1922 | Harriss | |
| 1,499,472 A | 7/1924 | Hazen | |
| 1,530,010 A | 3/1925 | Neilson | |
| 1,556,348 A | 10/1925 | Ray et al. | |
| 1,624,188 A | 4/1927 | Simon | |
| RE16,613 E | 5/1927 | Moody et al. | |
| 1,634,964 A | 7/1927 | Steinmetz | |
| 1,680,473 A | 8/1928 | Parker | |
| 1,686,298 A | 10/1928 | Uhl | |
| 1,712,164 A | 5/1929 | Peppin | |
| 1,716,670 A | 6/1929 | Sperry | |
| 1,731,091 A | 10/1929 | Belleville | |
| 1,737,483 A * | 11/1929 | Verret | 244/63 |
| 1,738,261 A | 12/1929 | Perkins | |
| 1,748,663 A * | 2/1930 | Tucker | 244/63 |
| 1,749,769 A | 3/1930 | Johnson | |
| 1,756,747 A | 4/1930 | Holland | |
| 1,777,167 A | 9/1930 | Forbes | |
| 1,816,976 A | 8/1931 | Kirkham | |
| 1,836,010 A | 12/1931 | Audrain | |
| 1,842,432 A * | 1/1932 | Stanton | 244/63 |
| 1,869,506 A | 8/1932 | Richardson | |
| 1,892,357 A | 12/1932 | Moe | |
| 1,909,445 A | 5/1933 | Ahola | |
| 1,912,723 A * | 6/1933 | Perkins | 244/63 |
| 1,925,212 A * | 9/1933 | Steiber | 244/63 |
| 1,940,030 A * | 12/1933 | Steiber | 244/63 |
| 1,960,264 A | 5/1934 | Heinkel | |
| 2,211,089 A | 8/1940 | Berlin | |
| 2,296,988 A * | 9/1942 | Endter | 292/214 |
| 2,333,559 A | 11/1943 | Grady et al. | |
| 2,342,773 A | 2/1944 | Wellman et al. | |
| 2,347,561 A | 4/1944 | Howard et al. | |
| 2,360,220 A | 10/1944 | Goldman | |
| 2,364,527 A | 12/1944 | Haygood | |
| 2,365,778 A | 12/1944 | Schwab | |
| 2,365,827 A | 12/1944 | Liebert | |
| 2,380,702 A | 7/1945 | Persons | |
| 2,390,754 A | 12/1945 | Valdene | |
| 2,435,197 A | 2/1948 | Brodie | |
| 2,436,240 A | 2/1948 | Wiertz | |
| 2,448,209 A | 8/1948 | Boyer et al. | |
| 2,465,936 A | 3/1949 | Schultz | |
| 2,488,050 A | 11/1949 | Brodie | |
| 2,515,205 A | 7/1950 | Fieux | |
| 2,526,348 A | 10/1950 | Gouge | |
| 2,669,403 A | 2/1954 | Milligan | |
| 2,671,938 A | 3/1954 | Roberts | |
| 2,735,391 A | 2/1956 | Buschers | |
| 2,787,185 A | 4/1957 | Rea et al. | |
| 2,814,453 A | 11/1957 | Trimble et al. | |
| 2,843,342 A | 7/1958 | Ward | |
| 2,844,340 A | 7/1958 | Daniels et al. | |
| 2,908,240 A | 10/1959 | Hodge | |
| 2,919,871 A | 1/1960 | Sorensen | |
| 2,933,183 A | 4/1960 | Koelsch | |
| 2,954,946 A * | 10/1960 | O'Neil et al. | 244/110 G |
| 3,069,118 A | 12/1962 | Bernard | |
| RE25,406 E | 6/1963 | Byrne et al. | |
| 3,163,380 A | 12/1964 | Brodie | |
| 3,268,090 A | 8/1966 | Wirkkala | |
| 3,411,398 A | 11/1968 | Blakeley et al. | |
| 3,454,244 A | 7/1969 | Walander | |
| 3,468,500 A | 9/1969 | Carlsson | |
| 3,484,061 A | 12/1969 | Niemkiewicz | |
| 3,512,447 A | 5/1970 | Vaughn | |
| 3,516,626 A | 6/1970 | Strance et al. | |
| 3,657,956 A | 4/1972 | Bradley et al. | |
| 3,672,214 A | 6/1972 | Yasuda | |
| 3,684,219 A | 8/1972 | King | |
| 3,708,200 A | 1/1973 | Richards | |
| 3,765,625 A | 10/1973 | Myhr et al. | |
| 3,771,484 A | 11/1973 | Schott et al. | |
| 3,827,660 A | 8/1974 | Doolittle | |
| 3,939,988 A | 2/1976 | Wellman | |
| 3,943,657 A | 3/1976 | Leckie | |
| 3,980,259 A | 9/1976 | Greenhalgh et al. | |
| 4,067,139 A | 1/1978 | Pinkerton et al. | |
| 4,079,901 A | 3/1978 | Mayhew et al. | |
| 4,143,840 A | 3/1979 | Bernard et al. | |
| 4,147,317 A | 4/1979 | Mayhew et al. | |
| 4,149,840 A | 4/1979 | Tippmann | |
| D256,816 S | 9/1980 | McMahon et al. | |
| 4,236,686 A | 12/1980 | Barthelme et al. | |
| 4,238,093 A | 12/1980 | Siegel et al. | |
| 4,279,195 A | 7/1981 | Miller | |
| 4,296,894 A | 10/1981 | Schnabele et al. | |
| 4,296,898 A | 10/1981 | Watson | |
| 4,311,290 A | 1/1982 | Koper | |
| 4,408,737 A | 10/1983 | Schwaerzler et al. | |
| 4,410,151 A | 10/1983 | Hoppner et al. | |
| 4,457,479 A | 7/1984 | Daude et al. | |
| 4,471,923 A | 9/1984 | Hoppner et al. | |
| 4,523,729 A | 6/1985 | Frick et al. | |
| 4,566,658 A | 1/1986 | DiGiovanniantonio et al. | |
| 4,645,142 A | 2/1987 | Soelter | |
| 4,653,706 A | 3/1987 | Ragiab | |
| 4,678,143 A | 7/1987 | Griffin et al. | |
| 4,730,793 A | 3/1988 | Thurber, Jr. et al. | |
| 4,753,400 A | 6/1988 | Reuter et al. | |
| 4,790,497 A | 12/1988 | Yoffe et al. | |
| 4,809,933 A | 3/1989 | Buzby et al. | |
| 4,842,222 A | 6/1989 | Baird et al. | |
| 4,909,458 A | 3/1990 | Martin et al. | |
| 4,979,701 A | 12/1990 | Colarik et al. | |
| 4,991,739 A | 2/1991 | Levasseur | |
| 5,007,875 A | 4/1991 | Dasa | |
| 5,039,034 A | 8/1991 | Burgess et al. | |
| 5,042,750 A | 8/1991 | Winter | |
| 5,054,717 A | 10/1991 | Taylor et al. | |
| 5,060,888 A | 10/1991 | Vezain et al. | |
| 5,109,788 A | 5/1992 | Heinzmann et al. | |
| 5,119,935 A | 6/1992 | Stump et al. | |
| 5,176,339 A | 1/1993 | Schmidt | |
| 5,222,694 A | 6/1993 | Smoot | |
| 5,253,605 A | 10/1993 | Collins | |
| 5,253,606 A | 10/1993 | Ortelli et al. | |
| 5,259,574 A | 11/1993 | Carrot | |
| 5,390,550 A | 2/1995 | Miller | |
| 5,407,153 A | 4/1995 | Kirk et al. | |
| 5,509,624 A | 4/1996 | Takahashi | |
| 5,583,311 A | 12/1996 | Rieger et al. | |
| 5,603,592 A | 2/1997 | Sadri et al. | |
| 5,655,944 A | 8/1997 | Fusselman | |
| 5,687,930 A | 11/1997 | Wagner et al. | |
| 5,762,456 A | 6/1998 | Aasgaard | |
| 5,816,761 A | 10/1998 | Cassatt et al. | |
| 5,906,336 A | 5/1999 | Eckstein | |
| 6,161,797 A | 12/2000 | Kirk et al. | |
| 6,237,875 B1 | 5/2001 | Menne et al. | |
| 6,264,140 B1 * | 7/2001 | McGeer et al. | 244/110 F |
| 6,371,410 B1 | 4/2002 | Cairo-Iocco et al. | |
| 6,416,019 B1 | 7/2002 | Hilliard et al. | |
| 6,457,673 B1 | 10/2002 | Miller | |
| 6,478,650 B1 | 11/2002 | Tsai et al. | |
| 6,695,255 B1 | 2/2004 | Husain | |
| 6,835,045 B1 | 12/2004 | Barbee et al. | |
| 7,059,564 B2 * | 6/2006 | Dennis | 244/110 F |
| 7,066,430 B2 | 6/2006 | Dennis et al. | |
| 7,090,166 B2 | 8/2006 | Dennis et al. | |
| 7,114,680 B2 * | 10/2006 | Dennis | 244/63 |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 * | 12/2006 | Roeseler et al. | 244/63 |
| 7,152,827 B2 | 12/2006 | McGeer | |
| 7,165,745 B2 | 1/2007 | McGeer et al. | |
| 7,175,135 B2 * | 2/2007 | Dennis et al. | 244/110 C |

(56) References Cited

U.S. PATENT DOCUMENTS

| | | | |
|---|---|---|---|
| 7,219,856 B2 * | 5/2007 | Watts et al. | 244/110 F |
| 7,259,357 B2 | 8/2007 | Walker | |
| 7,264,204 B1 | 9/2007 | Portmann | |
| 7,410,125 B2 | 8/2008 | Steele | |
| 7,422,178 B2 | 9/2008 | DeLaune | |
| 7,578,467 B2 * | 8/2009 | Goodrich | 244/110 C |
| 7,686,247 B1 | 3/2010 | Monson et al. | |
| 7,748,661 B2 | 7/2010 | Harris et al. | |
| 7,798,445 B2 | 9/2010 | Heppe et al. | |
| 7,806,366 B2 | 10/2010 | Jackson | |
| 8,136,766 B2 | 3/2012 | Dennis | |
| 8,313,057 B2 * | 11/2012 | Rednikov | 244/110 R |
| 2002/0011223 A1 | 1/2002 | Zauner et al. | |
| 2002/0049447 A1 | 4/2002 | Li | |
| 2002/0100838 A1 * | 8/2002 | McGeer et al. | 244/116 |
| 2003/0116107 A1 | 6/2003 | Laimbock | |
| 2003/0122384 A1 | 7/2003 | Swanson et al. | |
| 2003/0222173 A1 | 12/2003 | McGeer et al. | |
| 2005/0187677 A1 | 8/2005 | Walker | |
| 2006/0006281 A1 | 1/2006 | Sirkis | |
| 2006/0091258 A1 | 5/2006 | Chiu et al. | |
| 2006/0102783 A1 | 5/2006 | Dennis et al. | |
| 2006/0249623 A1 | 11/2006 | Steele | |
| 2006/0271251 A1 | 11/2006 | Hopkins | |
| 2008/0156932 A1 | 7/2008 | McGeer et al. | |
| 2008/0191091 A1 | 8/2008 | Hoisington et al. | |
| 2009/0224097 A1 | 9/2009 | Kariv | |
| 2009/0294584 A1 * | 12/2009 | Lovell et al. | 244/110 F |
| 2010/0318475 A1 | 12/2010 | Abrahamson | |

FOREIGN PATENT DOCUMENTS

| | | |
|---|---|---|
| DE | 19602703 | 2/1997 |
| EP | 0742366 | 11/1996 |
| FR | 854371 | 4/1940 |
| GB | 2080216 | 2/1982 |
| GB | 2093414 | 9/1982 |
| GB | 2150895 | 7/1985 |
| GB | 2219777 | 12/1989 |
| GB | 2231011 | 11/1990 |
| IL | 76726 | 1/1991 |
| JP | 07-304498 | 11/1995 |
| JP | 2008540217 | 11/2008 |
| WO | 0075014 | 12/2000 |
| WO | 0107318 | 2/2001 |
| WO | 2008015663 | 2/2008 |

OTHER PUBLICATIONS

"Ames Builds Advanced Yawed-Wing RPV," Aviation Week and Space Technology, Jan. 22, 1973, p. 73.

Article: R. Robinson, "Dynamic ; Analysis of a Carousel Remotely Piloted ; Vehicle Recovery System," 1977, Naval ; Post-Graduate School Master's Thesis, No. ADA052401.

Article: Stephen A. Whitmore, Mike Fife, and ; Logan Brashear: "Development of a Closed-Loop ; Strap Down Attitude System for an Ultrahigh Altitude; Flight Experiment," Jan. 1997, NASA Technical Memorandum 4775.

Phillips, K.; "Alternate Aquila Recovery System Demonstration Recovery System Flight Test;" Final Report; Jan. 19, 1977; 67 pages.

Study: US Army: H. E. Dickard, "Mini-RPV ; Recovery System Conceptual Study," Aug. 1977, Contract DA4J02-76-C-0048, Report No. USAAMRDL-TR077-24.

Extended European Search Report for European Patent Application No. 11831318, Applicant: Insitu, Inc., mailed Mar. 23, 2015, 13 pages.

* cited by examiner

LINE CAPTURE DEVICES FOR UNMANNED AIRCRAFT, AND ASSOCIATED SYSTEMS AND METHODS

CROSS-REFERENCE TO RELATED APPLICATION

The present application is a divisional application of U.S. patent application Ser. No. 13/483,330, filed May 30, 2012, which is a continuation of International Patent Application No. PCT/US2011/053534, filed Sep. 27, 2011, which claims priority to U.S. Provisional Patent Application No. 61/386,956, filed Sep. 27, 2010 each of which is incorporated herein in its entirety by reference.

TECHNICAL FIELD

The present disclosure describes line capture devices for unmanned aircraft, and associated systems and methods.

BACKGROUND

Unmanned aircraft or air vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage devices) typically require substantial space. Accordingly, these systems can be difficult to install and operate in cramped quarters, such as the deck of a small fishing boat, land vehicle, or other craft. Another drawback with some existing unmanned aircraft is that, due to small size and low weight, they can be subjected to higher acceleration and deceleration forces than larger, manned air vehicles and can accordingly be prone to damage, particularly when manually handled during recovery and launch operations in hostile environments, such as a heaving ship deck. Yet another drawback with some existing unmanned aircraft systems is that they may not be suitable for recovering aircraft in tight quarters, without causing damage to either the aircraft or the platform from which the aircraft is launched and/or recovered.

DETAILED DESCRIPTION

Figure 1A:
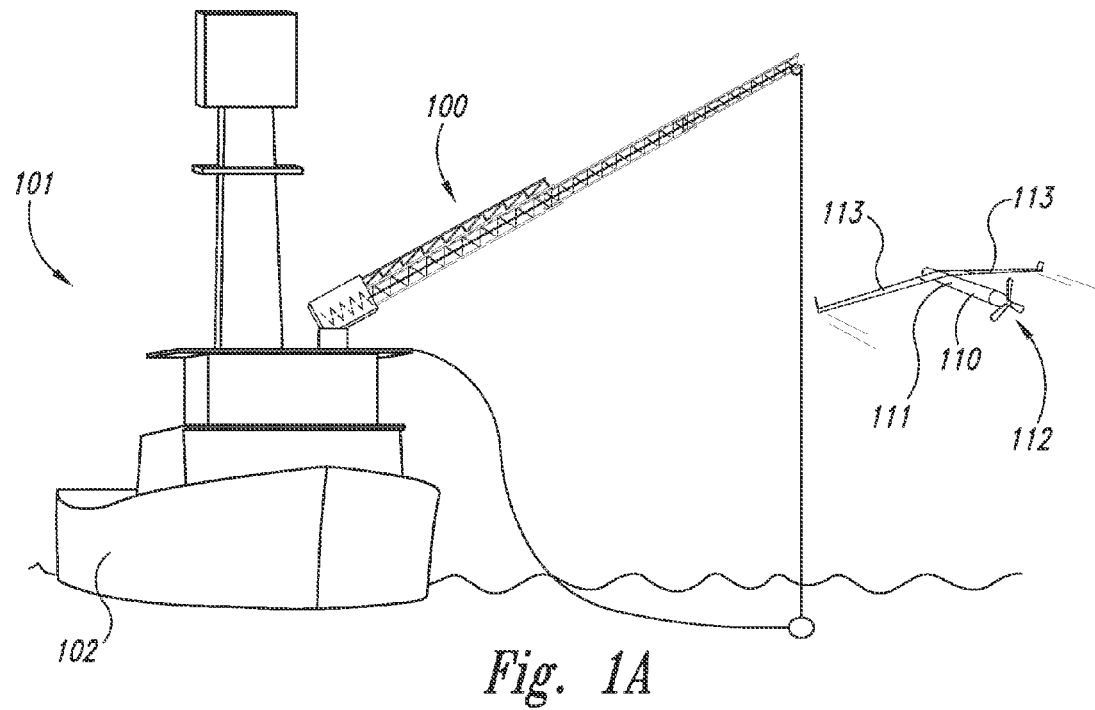
FIGS. 1A-1B illustrate an apparatus configured to recover unmanned aircraft in accordance with embodiments of the disclosure.
Figure 1B:
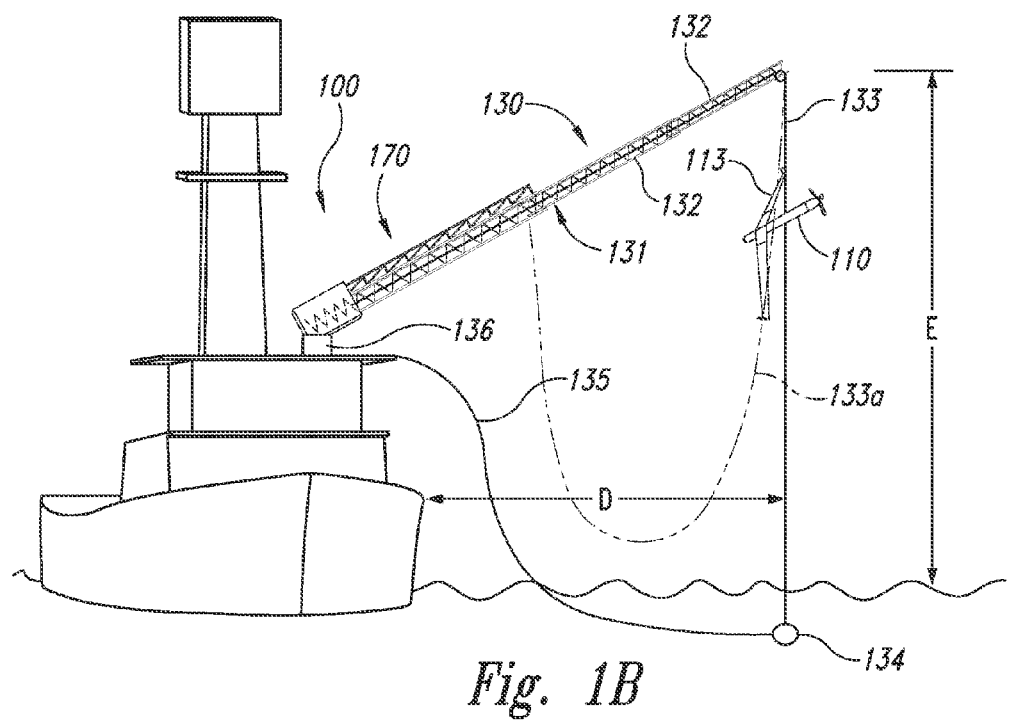

FIGS. 1A-1B illustrate overall views of apparatuses and methods for capturing unmanned aircraft in accordance with embodiments of the disclosure. Beginning with FIG. 1A, a representative unmanned aircraft 110 can be captured by an aircraft handling system 100 positioned on a support platform 101. In one embodiment, the support platform 101 can include a boat, ship, or other water vessel 102. In other embodiments, the support platform 101 can include other structures, including a building, a truck or other land vehicle, or an airborne vehicle, such as a balloon. In many of these embodiments, the aircraft handling system 100 can be configured solely to retrieve the aircraft 110 or, in particular embodiments, it can be configured to both launch and retrieve the aircraft 110. The aircraft 110 can include a fuselage 111 and wings 113 (or a blended wing/fuselage), and is propelled by a propulsion system 112 (e.g., a piston-driven propeller).

Referring now to FIG. 1B, the aircraft handling system 100 can include a recovery system 130 integrated with a launch system 170. In one aspect of this embodiment, the recovery system 130 can include an extendable boom 131 having a plurality of segments 132. The boom 131 can be mounted on a rotatable base 136 or turret for ease of positioning. The segments 132 are initially stowed in a nested or telescoping arrangement and are then deployed to extend outwardly as shown in FIG. 1B. In other embodiments, the extendable boom 131 can have other arrangements, such as a scissors arrangement, a parallel linkage arrangement or a knuckle boom arrangement. In any of these embodiments, the extendable boom 131 can include a recovery line 133 extended by gravity or other forces. In one embodiment, the recovery line 133 can include 0.25 inch diameter polyester rope, and in other embodiments, the recovery line 133 can include other materials and/or can have other dimensions (e.g., a diameter of 0.3125 inch). In any of these embodiments, a spring or weight 134 at the end of the recovery line 133 can provide tension in the recovery line 133. The aircraft handling system 100 can also include a retrieval line 135 connected to the weight 134 to aid in retrieving and controlling the motion of the weight 134 after the aircraft recovery operation has been completed. In another embodiment, a different recovery line 133a (shown in dashed lines) can be suspended from one portion of the boom 131 and can attach to another point on the boom 131, in lieu of the recovery line 133 and the weight 134.

In one aspect of this embodiment, the end of the extendable boom 131 can be positioned at an elevation E above the local surface (e.g., the water shown in FIG. 1B), and a distance D away from the nearest vertical structure projecting from the local surface. In one aspect of this embodiment, the elevation E can be about 15 meters and the distance D can be about 10 meters. In other embodiments, E and D can have other values, depending upon the particular installation. For example, in one particular embodiment, the elevation E can be about 17 meters when the boom 131 is extended, and about 4 meters when the boom 131 is retracted. The distance D can be about 8 meters when the boom 131 is extended, and about 4 meters when the boom 131 is retracted. In a further particular aspect of this embodiment, the boom 131 can be configured to carry both a vertical load and a lateral load via the recovery line. For example, in one embodiment, the boom 131 can be configured to capture an aircraft 110 having a weight of about 30 pounds, and can be configured to withstand a side load of about 400 pounds, corresponding to the force of the impact between the aircraft 110 and the recovery line 133 with appropriate factors of safety.

In any of the foregoing embodiments, the aircraft 110 is captured when it flies into the recovery line 133. Once captured, the aircraft 110 is suspended from the recovery line by a wing 113. Further details of apparatuses and methods for capturing the aircraft 110 are described below with reference to FIGS. 2A-7B.

Figure 2A:
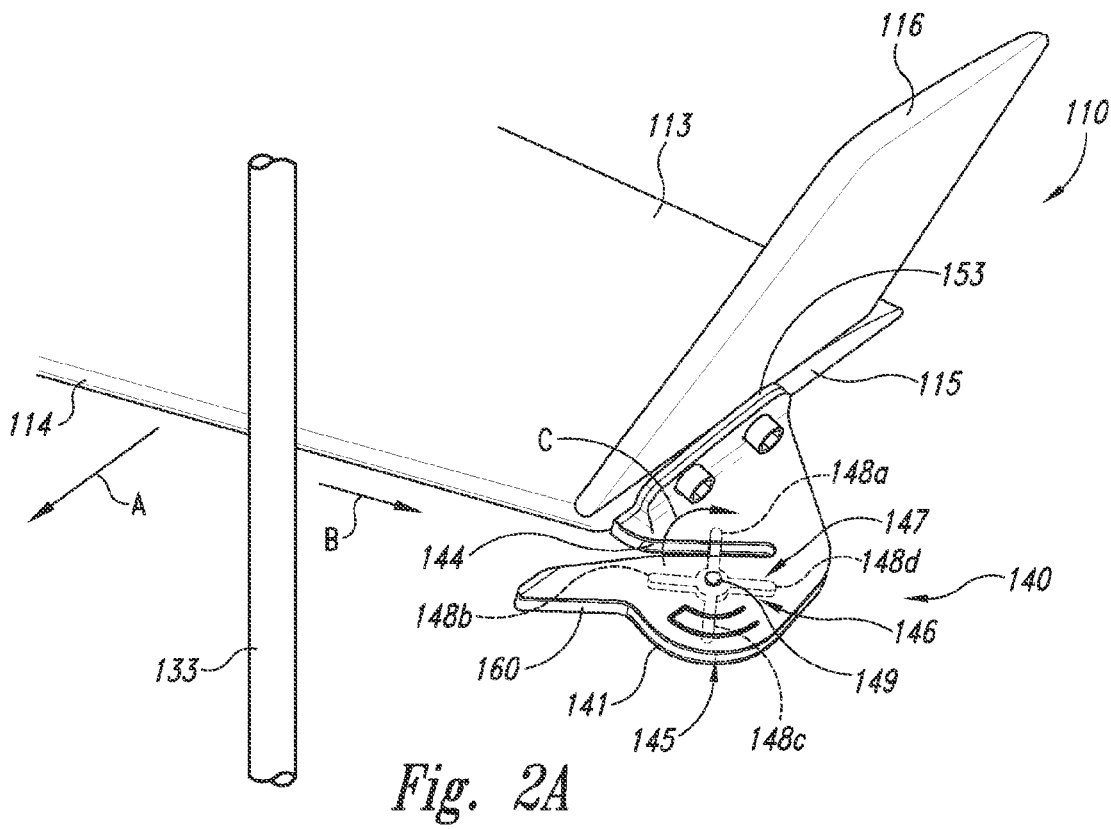
FIGS. 2A-2B are enlarged illustrations of a capture device in the process of capturing an unmanned aircraft in accordance with an embodiment of the disclosure.

FIG. 2A is a partially schematic, isometric illustration of an outboard portion of the wing 113 of the aircraft 110 shown in FIG. 1B. The wing 113 can include a winglet 116 in the illustrated embodiment but may have no winglets in other embodiments. In one aspect of the illustrated embodiment, the wing 113 includes a leading edge 114 (which can, but need not be swept), an outboard edge 115, and a line capture device 140 positioned at or near the outboard edge 115. In other embodiments, each wing 113 can include a plurality of line capture devices 140 located along the span of the wing 113, or a single line capture device located away from the outboard edge 115. In any of these embodiments, the line capture device 140 can have a cleat-type configuration. The line capture device 140 can include a line capture device body 141 with a flange 153 that is attached to the wing 113. In operation, the line capture device 140 engages the recovery line 133 to releasably and securely attach the aircraft 110 to the recovery line 133. The device 140 can include a line slot 144 positioned in the body 141, and retainer 146 movably attached to the body 141. As the aircraft 110 flies toward the recovery line 133 (as indicated by arrow A), the recovery line 133 strikes the wing leading edge 114 and causes the aircraft 110 to yaw toward the recovery line 133, which then slides outboard along the leading edge 114 toward the line capture device 140 (as indicated by arrow B). The recovery line 133 then passes into the line slot 144 and is retained in the line slot 144 by the retainer 146, as described in greater detail below. In other embodiments, the retainer can operate in other manners to secure the recovery line 133 in the line slot 144.

If the aircraft 110 is not properly aligned with the recovery line 133 during its approach, the recovery line 133 may strike the line capture device 140 instead of the leading edge 114. In one embodiment, the body 141 includes a body leading edge 160 that is swept aft so as to deflect the recovery line 133 away from the aircraft 110. This can prevent the line 133 from fouling and can reduce the yawing moment imparted to the aircraft 110, allowing the aircraft 110 to recover from the missed capture and return for another capture attempt.

Figure 2B:
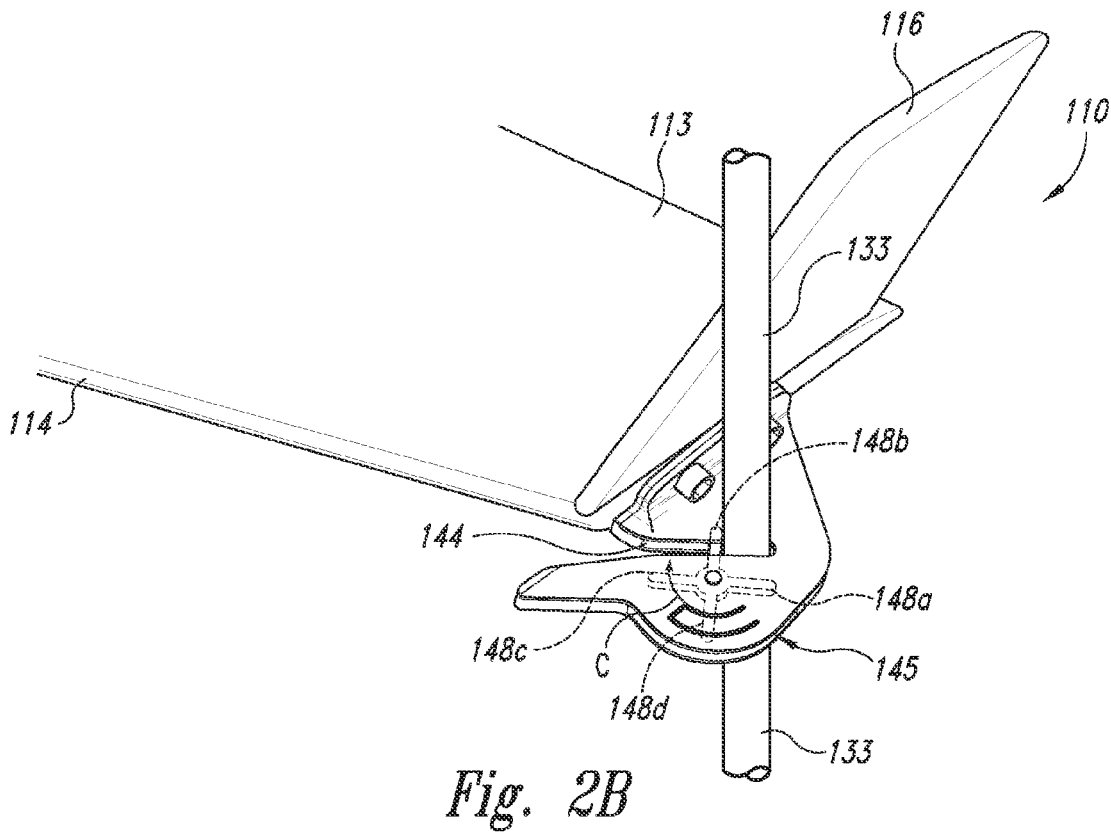

During capture, the recovery line 133 travels outboard along the wing leading edge 114 to position the recovery line 133 at the line slot 144 of the line capture device 140. In one aspect of this embodiment, the retainer 146 includes a rotor 147 that rotates relative to the body 141 within a rotor slot 145 via a pivot joint (e.g., a pin or axle 149). The rotor 147 includes multiple rotor arms 148, four of which are shown in FIG. 2A as a first rotor arm 148a, a second rotor arm 148b, a third rotor arm 148c, and a fourth rotor arm 148d. Before the line capture device 140 engages the recovery line 133, one of the rotor arms (e.g. the first rotor arm 148a) is located transverse to (e.g. perpendicular to) the line slot 144, and none of the remaining rotor arms extend into the line slot 144. Accordingly, the first rotor arm 148a can extend fully or at least partially across the line slot 144. The rotor 147 can be manually placed in this orientation, or a ratchet mechanism can ensure that the rotor 147 stops at only positions for which one of the rotor arms 148 extends transverse to the line slot 144. As the recovery line 133 passes into and along the line slot 144, it presses against the first rotor arm 148a, causing the rotor 147 to rotate clockwise, as indicated by arrow C. As the rotor 147 rotates, the recovery line 133 is permitted to pass to the end of the line slot 144. At the same time, the second rotor arm 148b rotates into the position previously occupied by the first rotor arm 148a, as shown in FIG. 2B. In one aspect of this embodiment, the line slot 144 (which can be tapered) has a width that is less than the diameter of the recovery line 133. Accordingly, the recovery line 133 can be pinched in the line slot 144 as it travels outboard and aft, securing the aircraft 110 to the recovery line 133. The momentum of the aircraft relative to the recovery line 133 provides the impetus to securely engage the recovery line 133 with the line capture device 140.

Figure 3A:
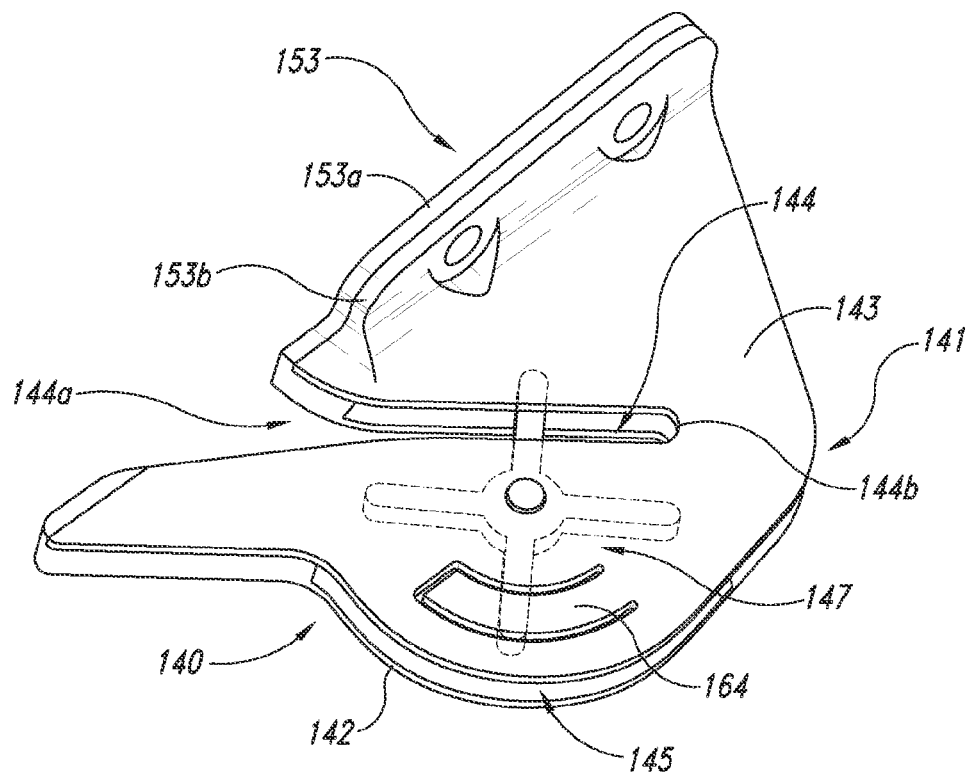
FIGS. 3A-3D illustrate an embodiment of the line capture device shown in FIGS. 2A-2B, and components of the device.

FIGS. 3A-3D illustrate further aspects of a particular embodiment of the line capture device 140 described above with reference to FIGS. 2A-2B. In FIG. 3A, the line capture device 140 is shown from above. The body 141 in this embodiment is formed from two components: a base or base portion 142 and a cover or cover portion 143 that is sealably attached to the base 142. Both the base 142 and the cover 143 have cut-outs that together define the line slot 144. The line slot 144 can have an open end 144a and a closed end 144b. Both the base 142 and the cover 143 have corresponding flange portions 153a, 153b, respectively, that together form the attachment flange 153 used to secure the line capture device 140 to the aircraft 110 (FIG. 2B). The central portions of the base 142 and the cover 143 are spaced apart from each other to define, at least in part, the rotor slot 145 in which the rotor 147 rotates. Accordingly, the rotor 147 can be protected from environmental factors and can be held in place by the base 142 and the cover 143 so as not to bend or deflect significantly as the recovery line 133 (FIG. 2B) impinges on the rotor arms 148. The cover 143 includes a ratchet device, e.g., a ratchet tab 164 that can be bounded by a milled or otherwise formed groove. Prior to first use, the ratchet tab 164 is bent downwardly (into the plane of FIG. 3A) toward the base 142. The tab 164 can accordingly be sloped inwardly into the rotor slot 145, in a direction generally tangential to the direction of rotation of the rotor 147. As a result, the ratchet tab 164 can resist but allow clockwise rotation by the rotor 147, and prevent significant counterclockwise rotation. In this manner, the ratchet tab 164 can allow the rotor 147 to turn as it captures the recovery line 133, and prevent the rotor 147 from releasing the recovery line 133 until an operator actively manipulates the device 140.

Figure 3B:
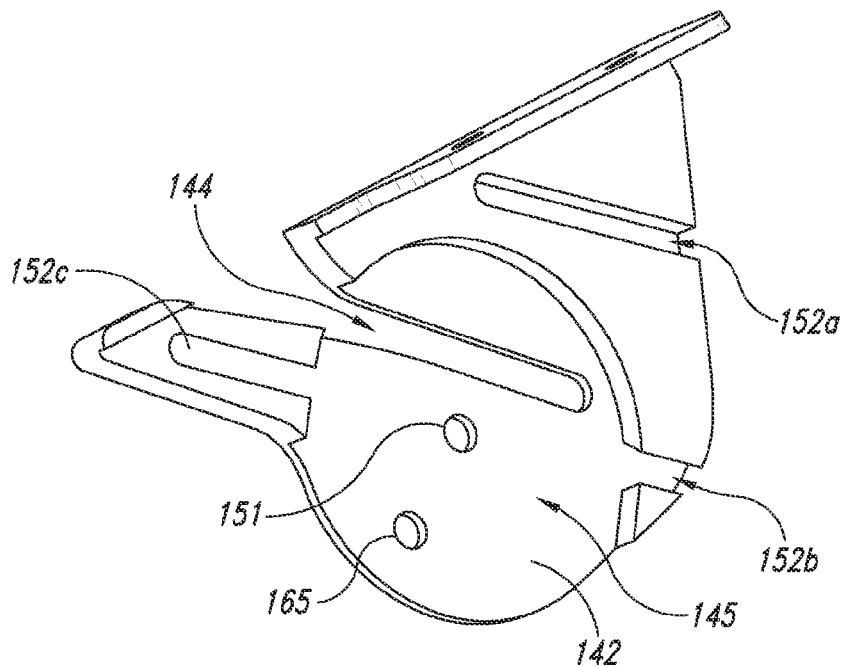

FIG. 3B is a top isometric view of an embodiment of the base 142. As described above, the base 142 includes a cut-out that defines, in part, the line slot 144, and a cut-out that defines, in part, the rotor slot 145. The base 142 also includes a pin aperture 151 that receives one end of the pin or axle 149 shown in FIG. 2A. The base 142 can also include features that aid in aligning and securing it to the cover 143 (FIG. 3A). For example, the base 142 can include multiple alignment slots 152, shown in FIG. 3B as a first alignment slot 152a, a second alignment slot 152b, and a third alignment slot 152c. The alignment slots 152a-152c align with corresponding tabs carried by the cover 143, as discussed further below with reference to FIG. 3C. In one aspect of an embodiment shown in FIG. 33, at least one of the alignment slots (e.g. the second alignment slot 152b) is tapered to prevent the corresponding tab from pulling out of the slot in a direction generally normal to the plane of FIG. 3B. The base 142 can also include a release aperture 165 or other feature that allows the operator to release the recovery line 133 (FIG. 3A) after the capture operation is complete. In one embodiment, the release aperture 165 is positioned to allow the operator to insert a tool into the rotor slot 145. The tool presses outwardly against the ratchet tab 164 (FIG. 3A) so that the operator can rotate the rotor counterclockwise and release the recovery line 133.

Figure 3C:
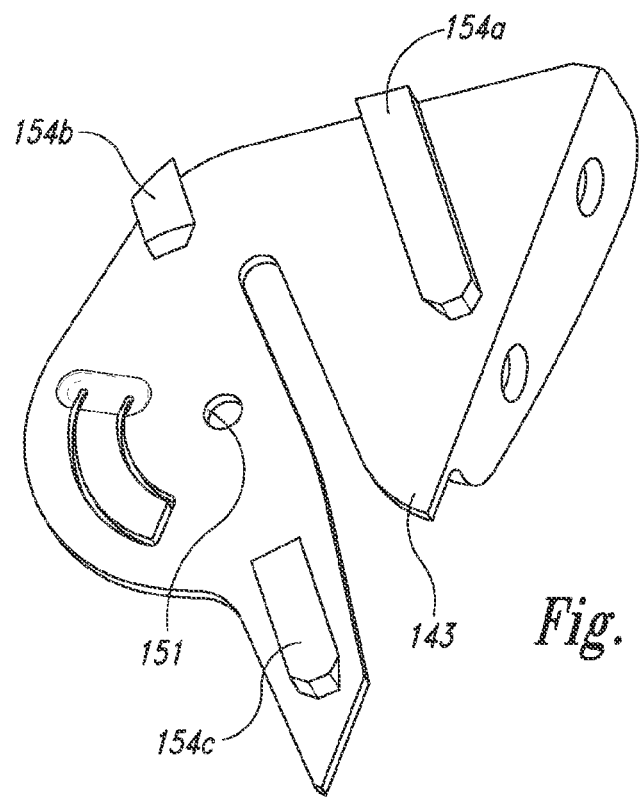

FIG. 3C is a bottom isometric view of the cover 143, illustrating the corresponding tabs 154 (shown as a first tab 154*a*, a second tab 154*b*, and a third tab 154*c*) that are received in the alignment slots 152*a*-152*c* described above with reference to FIG. 3B, The second tab 154*b* has tapered sides that slide into the second alignment slot 152*b* and that resist relative motion normal to the plane at FIG. 3C between the cover 143 and the base 142. The cover 143 also includes a pin aperture 151 that receives one end of the axle or pin 149, thus securing the pin between the cover 143 and the base 142 and capturing the rotor 147 in the rotor slot 145.

Figure 3D:
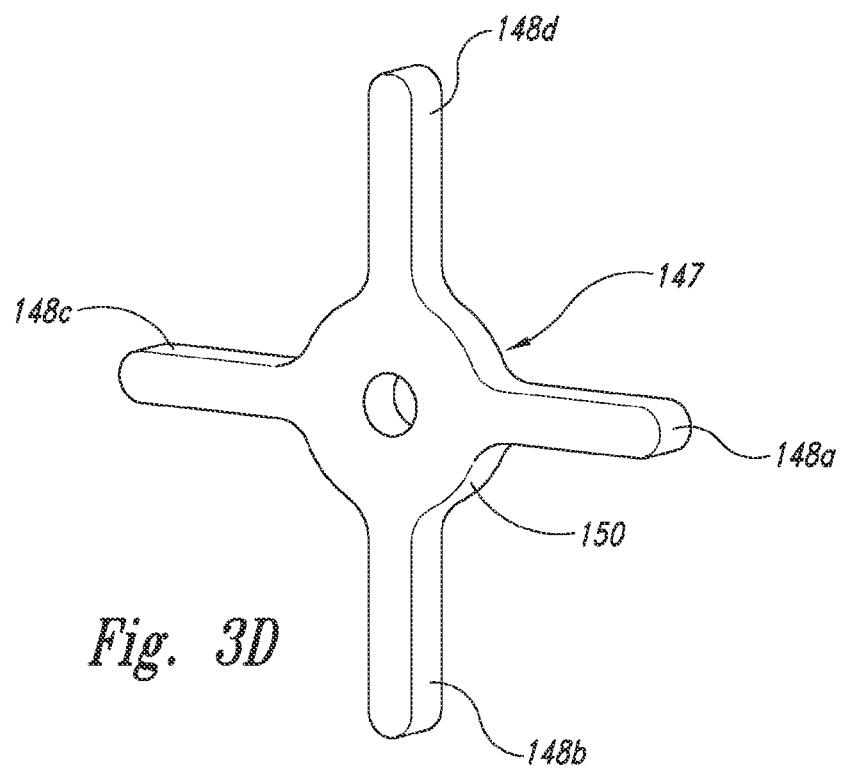

FIG. 3D is an isometric illustration of the rotor 147. The rotor 147 includes a hub 150, the four rotor arms 148*a*-148*d*, and a pin aperture 151 that receives the pin 149 described above. In a particular embodiment, the rotor 147 includes four rotor arms to ensure that only one rotor arm is positioned in the corresponding line slot 144 at a time. In other embodiments, for example, if the line slot has other shapes or geometries, the rotor 147 can include other numbers of rotor arms 148. One representative example is described further below with reference to FIG. 4.

Figure 4:
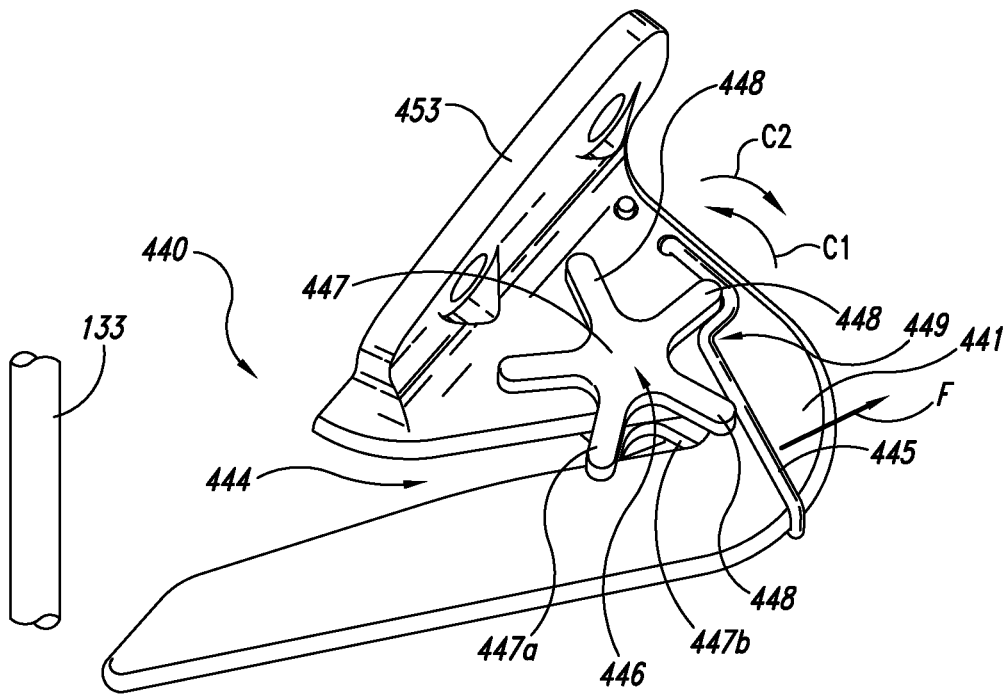
FIG. 4 illustrates a line capture device having a multi-component rotor in accordance with an embodiment of the disclosure.

FIG. 4 is a partially schematic, isometric illustration of a line capture device 440 configured in accordance with another embodiment of the disclosure. In one aspect of this embodiment, the line capture device 440 includes a body 441 and a flange 453 for securing the body 441 to the aircraft 110 (FIG. 1A). The body 441 has a line capture slot 444 that operates in generally the same manner described above with reference to FIGS. 2A-3D. The line capture device 440 further includes a retainer 446 having a rotor 447 that rotates relative to the body 441 via a pin or axle (not visible in FIG. 4). The rotor 447 can include a first or upper rotor portion 447*a* positioned adjacent to an upward facing surface of the body 441, and a second or lower portion 447*b* positioned adjacent the opposite face of the body 441. The first and second portions 447*a*, 447*b* are connected to each other via the pin, which passes through a corresponding pin aperture in the body 441. Thus, unlike the arrangement described above with reference to FIGS. 3A-3D, the line capture device 440 has two rotor portions with the body 441 positioned in between, rather than a single rotor portion positioned between a body and a cover.

The retainer 446 shown in FIG. 4 can further include a ratchet device that includes a ratchet spring 445 shaped to engage any of the rotor arms 448 carried by the rotor 447. The ratchet spring 445 is shaped to provide a biasing force directed toward the left of FIG. 4, and, as shown in FIG. 4, bears on two of the rotor arms 448 simultaneously. Accordingly, the ratchet spring 445 can engage the ends of the rotor arms 448. The ratchet spring 445 can include a dog-leg or jog 449 that bears against the side of one of the arms 448 to restrict or prevent the rotor 447 from rotating counterclockwise. This arrangement keeps the rotor 447 in position until the recovery line 133 strikes it and rotates it in a first direction, e.g., counterclockwise (as indicated by arrow C1) as the recovery line 133 passes along the length of the line capture slot 444. The rotor 447 is at least restricted from rotating in a second direction, e.g., clockwise (as indicated by arrow C2). Because the rotor 447 is positioned toward the end of the line capture slot 444, it can include more than four rotor arms 448 (e.g. five rotor arms 448) with only one of the rotor arms 448 positioned across the line capture slot 444.

One feature of the line capture device 440 shown in FIG. 4 is that the ratchet arrangement keeps the recovery line 133 from being pulled out of the line capture slot 444 even if the recovery line 133 folds during the capture operation. Another feature of this embodiment is that it requires no setup prior to use. That is, the ratchet spring 445 operates to always place the rotor 447 in a position suitable for capture. Still a further feature is that the line capture device 440 can be easily disengaged from the recovery line 133, e.g., by (a) pushing the ratchet spring 445 away from the rotor 447 (as indicated by arrow F), thus allowing the rotor 447 to rotate freely in a clockwise direction C2, and then (b) moving the recovery line 133 out of the line capture slot 444.

Figure 5A:
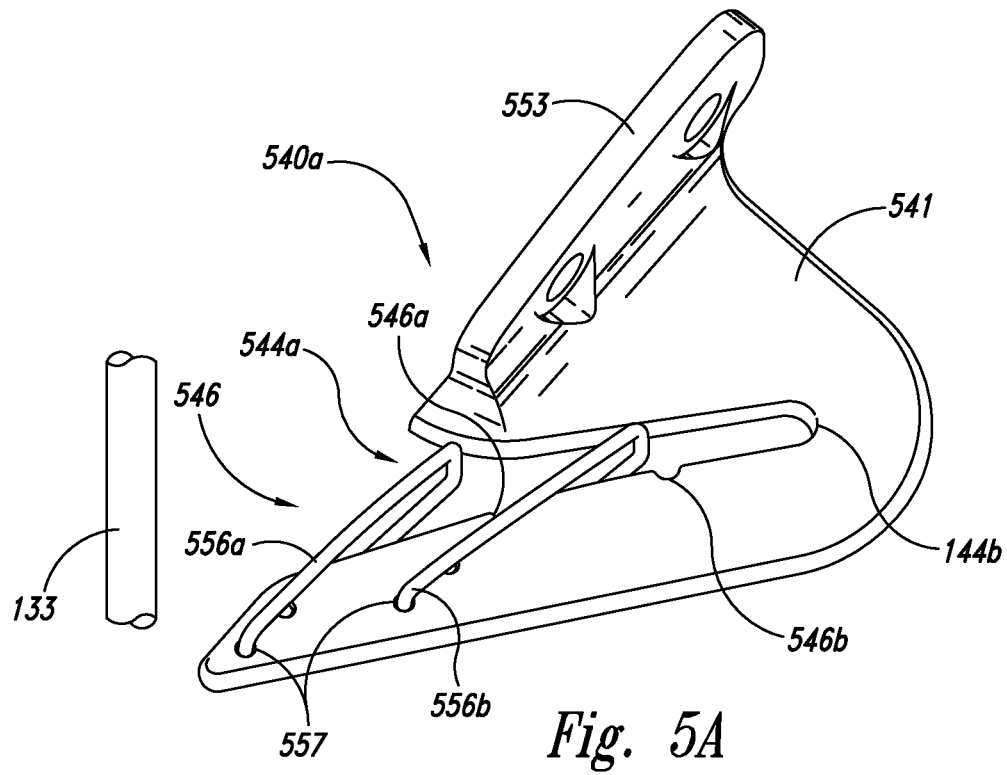
FIG. 5A-5C illustrate line capture devices having capture gates in accordance with further embodiments of the disclosure.

FIG. 5A is a partially schematic, top isometric illustration of a line capture device 540*a* configured in accordance with yet another embodiment of the disclosure. In this embodiment, the line capture device 540*a* includes a body 541 having a line slot 544*a* and a flange 553. The line capture device 540*a* also include a retainer 546 that in turn includes multiple independently operable gates 556 (two are shown in FIG. 5 as a first gate 556*a* and a second gate 556*b*). The gates 556 can include flexible but resilient wires or wire-shaped elements that are attached to the body 541 so as to be biased to positions that extend across the line slot 544*a*. As the recovery line 133 passes into the line slot 544*a*, it can push one or both of the gates 556*a*, 556*b* out of the way, and allow the gate(s) to spring back into position, thus securing the recovery line 133 within the line slot 544*a*. Because the gates 556*a*, 556*b* are independently operable, they provide a redundancy feature. As discussed above, the gates 556*a*, 556*b* can be formed from a suitable high strength wire, and can be rigidly connected to the body 541. Accordingly, the gates 556 twist about an axis generally perpendicular to the plane of FIG. 5A when impinged upon by the recovery line 133. The body 541 can include two receptacles 546*a*, 546*b* that receive the ends of the corresponding gates 556*a*, 556*b* to allow each gate to (successively) completely clear the line slot 544*a* as the recovery line 133 passes by. The spring force of the wire (or other resilient material forming the gates 556*a*, 556*b*) in torsion causes the gates to return to the positions shown in FIG. 5A after the recovery line 133 has passed into the line slot 544*a*. The body 541 can include through-holes 557, with coaxial openings in the oppositely facing surfaces of the body 541, that receive the proximal ends of the wire-shaped elements forming the gates 556, for securing the elements to the body. The arrangement shown in FIG. 5A has the advantage of simplicity due to the relatively small number of parts it requires.

Figure 5B:
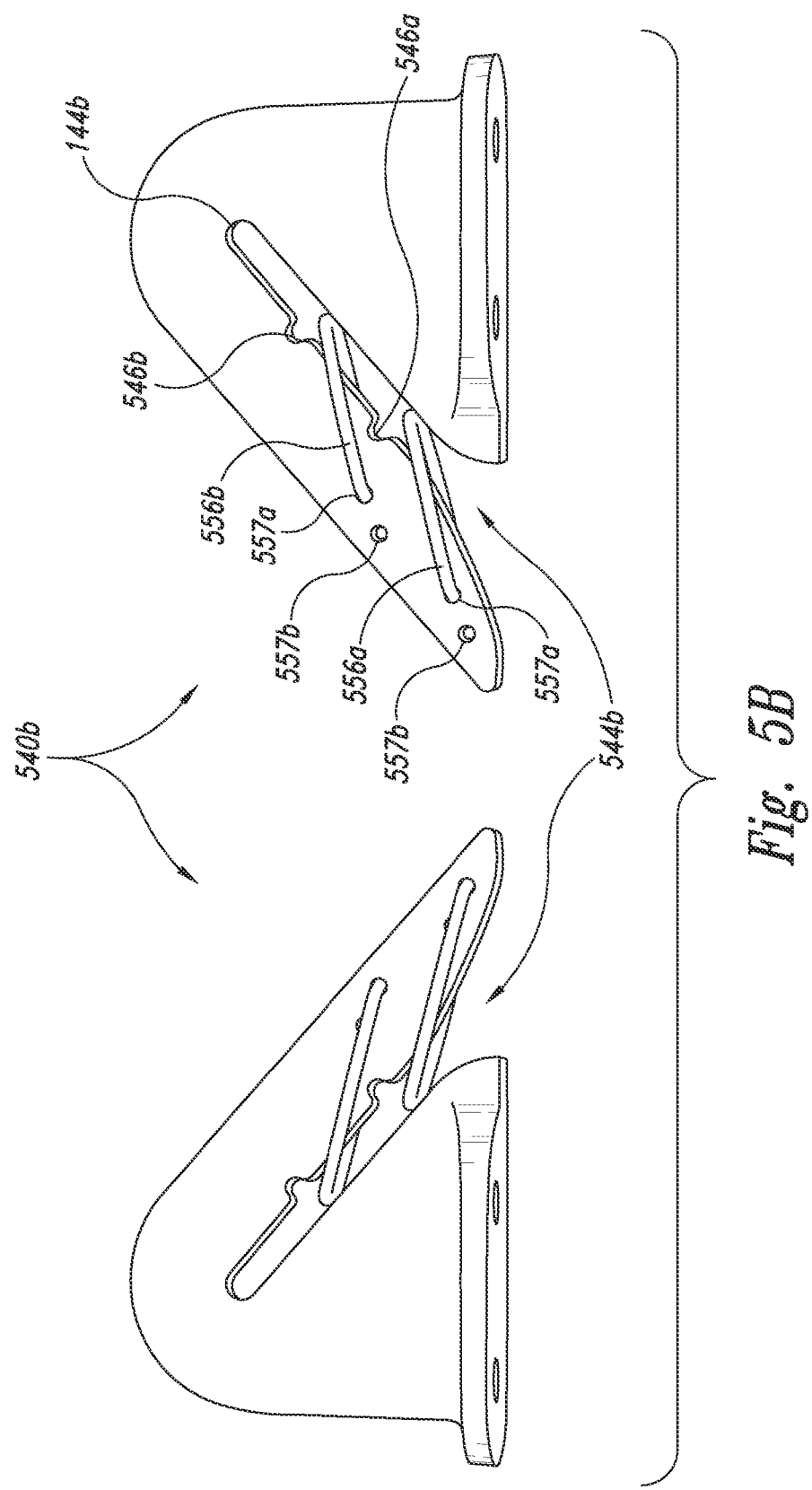

FIG. 5B illustrates two line capture devices 540*b* (one for a right wing 113 and the other for a left wing 113), each having a configuration in accordance with another embodiment of the disclosure. In this particular embodiment, the line capture devices 540*b* operate generally similar to the line capture device 540*a* described above with reference to FIG. 5A. In addition, the line capture devices 540*b* include a line slot 544*b* that is narrow in the region between the first and second gates 556*a*, 556*b*. Accordingly, it is expected that this arrangement will more securely capture a recovery line that passes the first gate 556*a* but not the second gate 556*b*. In the embodiments shown in FIGS. 5A and 5B, the gates 556*a*, 556*b* can be spaced apart from each other by a distance sufficient to accommodate the capture line 133 (FIG. 5A), and the second gate 556*b* can be spaced apart from the closed end 144*a* of the line slot 544*a*, 544*b* by a distance sufficient to accommodate the capture line 133. In a particular aspect of an embodiment shown in FIG. 5B, the proximal ends of the wire-shaped elements forming the gates 556*a*, 556*b* can be offset, and can be received in corresponding offset holes 557a, 557b in the body 541. The holes can be through holes or can extend part-way through the opposing surfaces of the body 541.

Figure 5C:
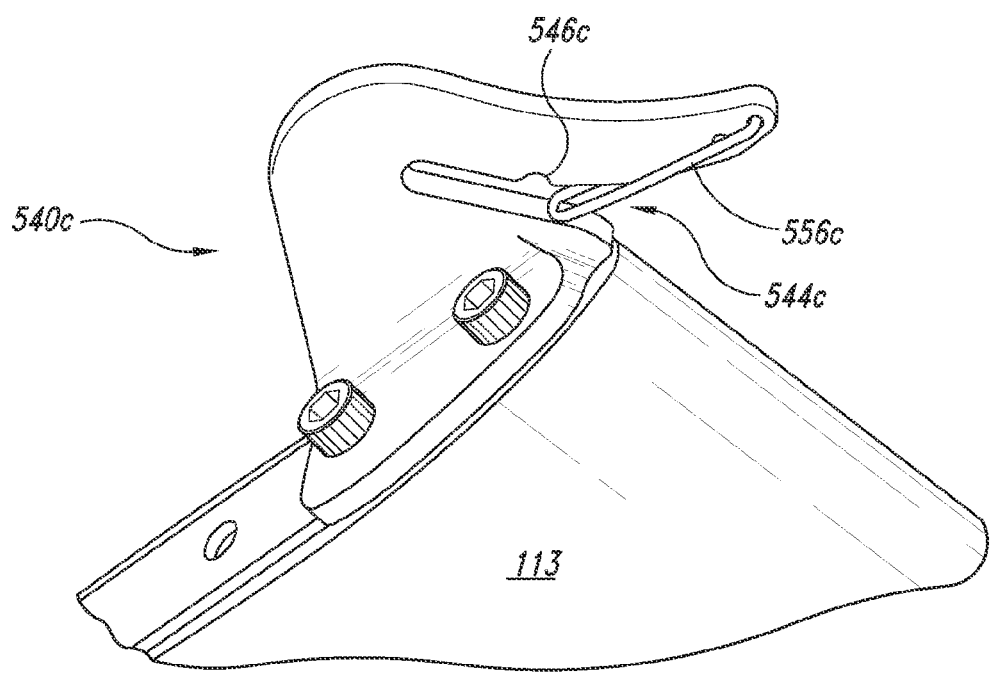

FIG. 5C illustrates another line capture device 540c. The line capture device 540c has a single gate 556c that is structurally similar to the first and second gates 556a, 556b described above, and that is attached to the corresponding body 541 in a generally similar manner, so as to be biased to a position that extends across a corresponding line slot 544c. A receptacle 546c along the edge of the line slot 544c receives the end of the gate 556c as the gate opens. The foregoing arrangement has the advantage of being simpler than the arrangements described above with reference to FIGS. 5A and 5B. Conversely, the arrangements described above with reference to FIGS. 5A and 5B can provide redundancy and an additional level of security for capturing the recovery line 133.

Figure 6:
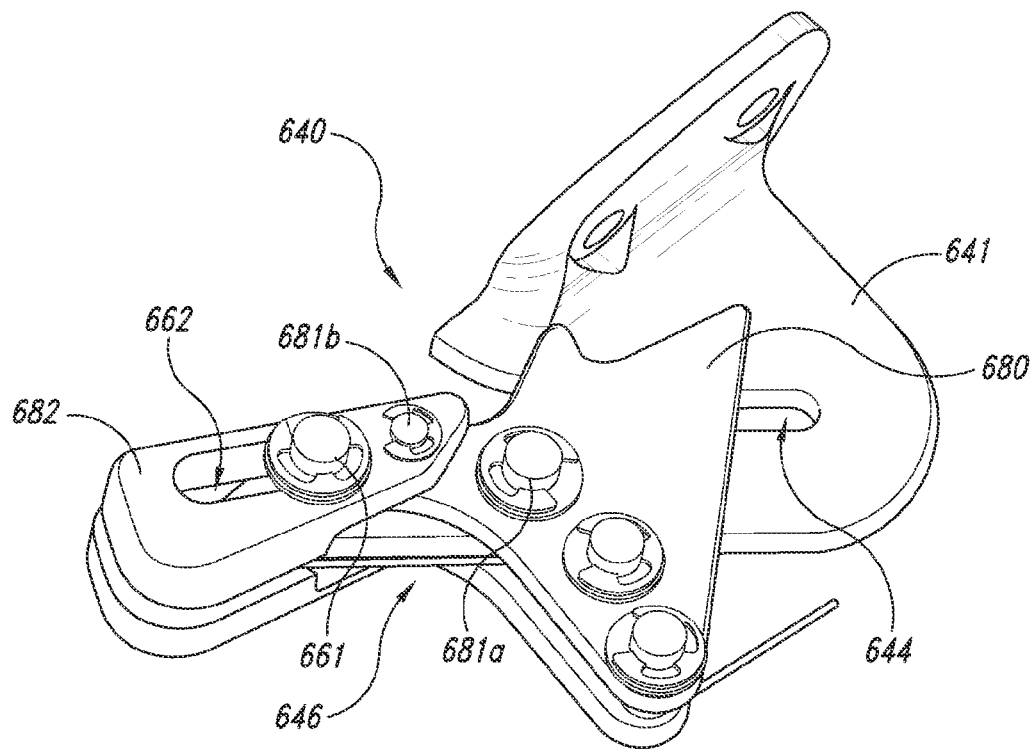
FIG. 6 illustrates a line capture device having a sliding linkage gate in accordance with an embodiment of the disclosure.

FIG. 6 illustrates still another line capture device 640 that includes a body 641 having a line slot 644. The body 641 carries a retainer 646 that slides relative to the body 641 during capture. In particular, the retainer 646 can include a strike plate 680 and a closing tab 682. The strike plate 680 is pivotably connected to the body 641 at a first pivot joint 681a, and is pivotably connected to the closing tab 682 at a second pivot joint 681b. The strike plate 680 also carries a guide pin 661 that is received in a corresponding guide slot 662 of the closing tab 682. In operation, the closing tab 682 can guide the recovery line 633 to hit the strike plate 680, which can be spring-loaded. Upon being struck by the recovery line 133, the strike plate 680 rotates clockwise about the first pivot joint 681a, opening the line slot 644 and allowing the recovery line 633 to pass into the line slot 644. As the strike plate 680 rotates, it pulls the closing tab 682 across the entrance of the line slot 644 via the second pivot joint 681b. The motion of the closing tab 682 is guided by the guide pin 661 received in the guide slot 662.

Figure 7A:
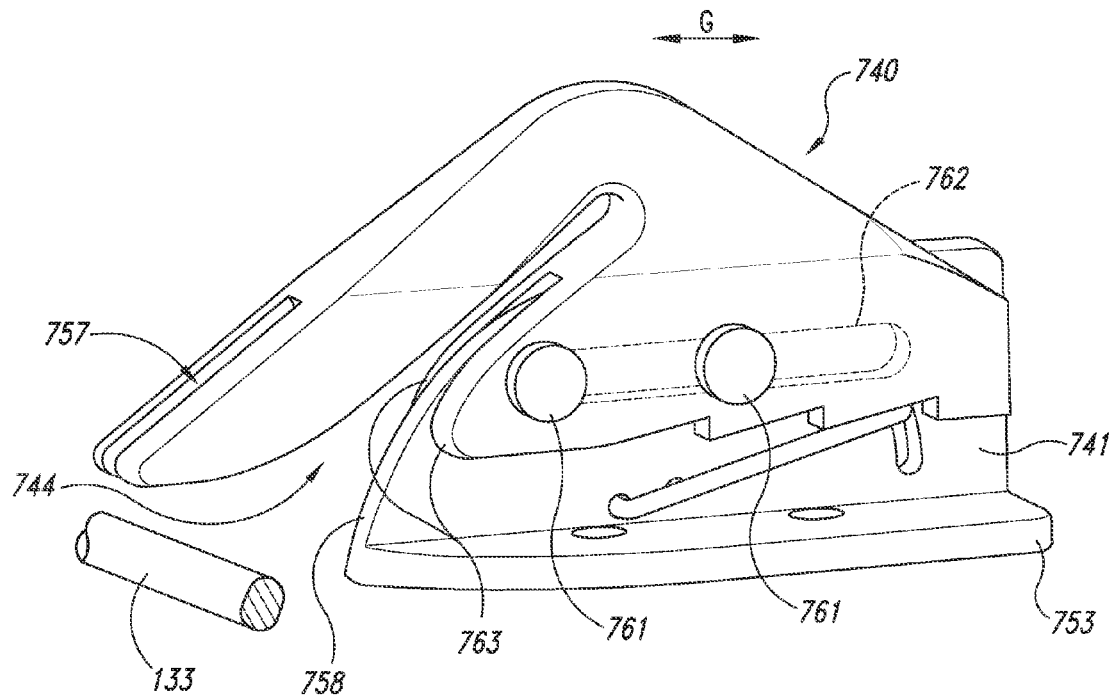
FIGS. 7A-7B illustrate a line capture device having a translating retainer in accordance with an embodiment of the disclosure.
Figure 7B:
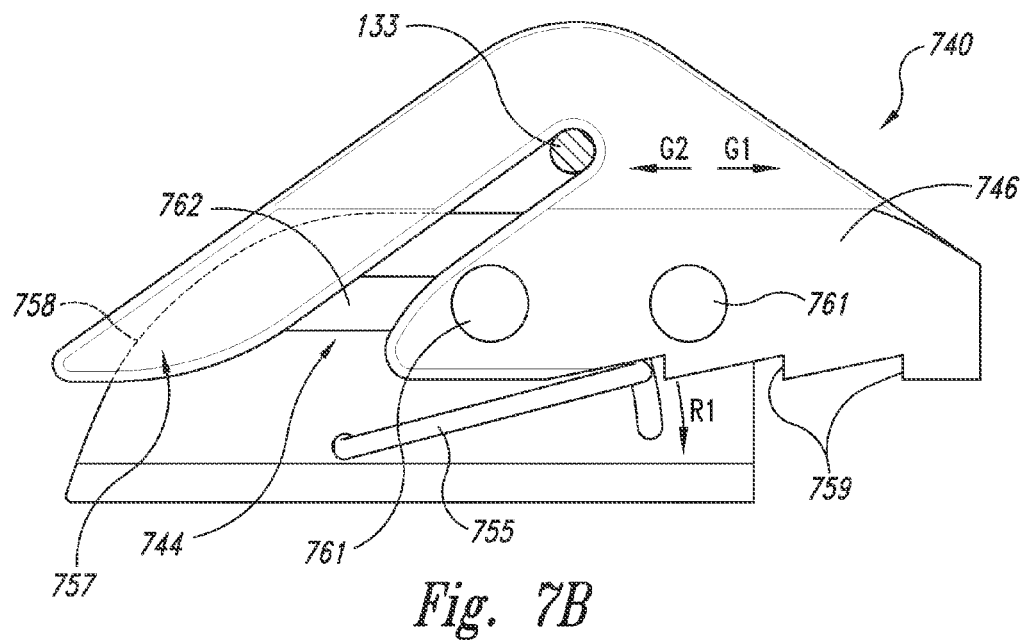

FIGS. 7A and 7B illustrate still another line capture device 740 in accordance with an embodiment of the disclosure. Referring first to FIG. 7A, the line capture device 740 includes a body 741 carrying a mounting flange 753. The body 741 also includes a guide slot 762. A retainer 746 has two ears 763, each of which extends around an oppositely facing side of the body 741. One or more guide pins 761 (e.g., two) connect the two ears 763 together and pass through the guide slot 762. Accordingly, the retainer 746 can translate back and forth as indicated by arrow G relative to the body 741. The retainer 746 includes a line slot 744 into which the recovery line 133 passes during a recovery/capture process. The retainer 746 also includes a retainer slot 757 that receives a corresponding body tab 758 of the body 741 when the recovery line 133 has been captured, as discussed further below with reference to FIG. 7B.

FIG. 7B illustrates the line capture device 740 after it has successfully engaged the recovery line 133, The recovery line 133 has passed to the end of the line slot 744, and the force of the recovery line 133 on the retainer 746 has driven the retainer to the right as indicated by arrow G1, with guidance provided by the guide pins 761 in the guide slot 762, Once in this closed position, a ratchet spring 755 carried by the body 741 engages one of the ratchet teeth 759 carried by the retainer 746 to prevent the retainer from moving to the left, which would allow the recovery line 133 to escape from the line slots 744, As the retainer 746 moves to the right as indicated by arrow G1, the body tab 758 passes into the retainer slot 757. This action prevents the retainer 746 from bending or deflecting outwardly from the plane of FIG. 7B, which might otherwise allow the recovery line 133 to pass out at the slot 744. To disengage the recovery line 133, the operator can rotate the ratchet spring as indicated by arrow R1 and slide the retainer 746 as indicated by arrow G2.

One feature of the embodiments described above with reference to FIGS. 1A-7B is that the line capture devices can not only capture the recovery line, but also resist or account for a tendency of the recovery line to disengage from the line slot as the aircraft twists and rotates during the capture maneuver. Accordingly, embodiments of the present disclosure are expected to secure the aircraft with a potentially greater degree of reliability than other devices.

From the foregoing, it will be appreciated that specific embodiments of the disclosure have been described herein for purposes of illustration, but that various modifications may be made without deviating from the disclosure. For example, the slots for capturing the recovery line can have other orientations, shapes, and/or sizes in other embodiments. The devices used to retain the recovery lines within the slots can include other arrangements to keep them biased in the closed position. Such arrangements can include other types of springs. The devices can include other components or other arrangements of components in other embodiments. The retainers can move between first positions (restricting access to the line slot) and second positions (allowing access to the line slot) that are different than those described above. The rotor rotation directions can be different than those expressly disclosed above. In many of these embodiments, the recovery line forces the retainer to move from the first position to the second position. In other embodiments, other forces can cause this motion. The boom and/or other elements supporting the recovery line can have other configurations in other embodiments.

Certain aspects of the disclosure described in the context of particular embodiments may be combined or eliminated in other embodiments. For example, the line capture devices were described in the context of a representative unmanned air vehicle shown in FIGS. 1A and 1B. In other embodiments, any of the foregoing line capture devices can be mounted on suitable aircraft having other configurations. The alignment slots and tabs described above in the context of the base and cover, respectively, in FIGS. 3B and 3C can be "swapped" and instead placed on the cover and base, respectively. Further, while advantages associated with certain embodiments have been described in the context of those embodiments, other embodiments may also exhibit such advantages and not all embodiments need necessarily exhibit such advantages to fall within the scope of the present disclosure. Accordingly, the disclosure can encompass other embodiments not expressly described or shown herein.

We claim:

1. An aircraft system, comprising:
   a line capture device body having a line slot, the line slot having an open end and a closed end;
   a retainer positioned proximate to the line slot, the retainer including a rotor having a plurality of rotor arms positioned to extend at least partially across the line slot as the rotor rotates relative to the body;
   a joint rotatably coupling the rotor to the body; and
   a ratchet device operably coupled to the rotor to allow the rotor to rotate in a first direction and at least restrict the rotor from rotating in a second direction opposite the first.

2. The system of claim 1 wherein the line capture device body includes a base portion and a cover portion carried by the base portion, with at least part of the base portion spaced apart from at least part of the cover portion to define, at least in part, a rotor slot, and wherein the rotor is rotatably positioned between the base portion and the cover portion in the rotor slot.

3. The system of claim 2 wherein the ratchet device includes a ratchet tab projecting inwardly into the rotor slot from at least one of the base portion and the cover portion, the ratchet tab being sloped inwardly into the rotor slot.

4. The system of claim 2 wherein at least one of the base portion and the cover portion includes a tab and wherein the other of the base portion and the cover portion includes an alignment slot positioned to receive the tab and resist relative motion between the cover portion and the base portion.

5. The system of claim 1 wherein the line capture device body has a first surface and a second surface facing away from the first surface, and wherein the rotor is a first rotor positioned adjacent to the first surface, and wherein the system further comprises a second rotor positioned adjacent to the second surface and rotatably coupled to the line capture device body, the second rotor having a plurality of rotor arms positioned to extend at least partially across the line slot as the second rotor rotates relative to the line capture device body.

6. The system of claim 1 wherein individual rotor arms have ends positioned radially outwardly from a pin, and wherein the ratchet device includes a spring positioned to successively engage with the ends of corresponding individual rotor arms as the rotor rotates relative to the line capture device body.

7. The system of claim 1 wherein the line slot is tapered between the open end and the closed end.

8. The system of claim 1, further comprising an aircraft having a fuselage and a wing, and wherein the line capture device body is attached to the wing.

9. The system of claim 8 wherein the line capture device body has a leading edge, and wherein the leading edge is swept aft relative to the fuselage.

10. The system of claim 8 wherein the line capture device body is positioned away from an outboard edge of the wing.

11. The system of claim 1, further comprising:
a recovery line; and
a support carrying the recovery line.

12. An aircraft system, comprising: a line capture device having a line capture device body, a rotor rotatably attached to the line capture device body, and a ratchet device configured to restrict a first direction of rotation of the rotor relative to the line capture device body;
wherein the rotor comprises a hub and a plurality of rotor arms extending outwardly from the hub,
wherein the line capture device body includes a line slot configured to receive a recovery line, and
wherein at least a portion of the rotor is positioned to extend at least partially across the line slot when the rotor is in a first orientation relative to the line capture device body.

13. The system of claim 12 wherein the line capture device body includes a base portion, a cover portion carried by the base portion, and a rotor slot defined at least in part by a space between a surface of the base portion and a surface of the cover portion, and wherein the rotor is positioned at least partially within the rotor slot.

14. The system of claim 13 wherein at least one of the base portion and the cover portion includes a tab and wherein the other of the base portion and the cover portion includes an alignment slot positioned to receive the tab.

15. The system of claim 12 wherein the ratchet device includes a ratchet tab bent toward an interior opening of the line capture device body.

16. The system of claim 12 wherein:
the line capture device body has a first surface and a second surface facing away from the first surface;
the rotor includes a first rotor portion positioned adjacent to the first surface and a second rotor portion positioned adjacent to the second surface; and wherein
the system further comprises an axle connecting the first rotor portion to the second rotor portion.

17. The system of claim 12 wherein the ratchet device includes an elongated spring positioned to engage at least a portion of the rotor.

18. The system of claim 12 wherein the line capture device is a first line capture device, and wherein the system further comprises a second line capture device.

19. An aircraft system, comprising: a line capture device body attached to a wing of an aircraft and having a line slot with an open end and a closed end, the line slot being configured to receive a recovery line;
a rotor comprising a hub and a plurality of rotor arms extending outwardly from the hub, the rotor rotatably coupled to the line capture device body, at least a portion of the rotor extending at least partially across the line slot when the rotor is in at least one orientation relative to the line capture device body; and
a ratchet device; wherein
the rotor is positioned to rotate in a first direction when the recovery line presses against the portion of the rotor, and wherein
the ratchet device is positioned to allow the rotor to rotate in the first direction and limit rotation of the rotor in a second direction opposite the first direction.

* * * * *